March 10, 1925.

P. BURKE

POWER SHOVEL

Filed Dec. 18, 1922

1,529,391

2 Sheets-Sheet 2

WITNESSES
M. E. Downey
C. L. Neal

INVENTOR
Paul Burke
by Louis Lucas
ATTORNEY

Patented Mar. 10, 1925.

1,529,391

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

POWER SHOVEL.

Application filed December 18, 1922. Serial No. 607,510.

*To all whom it may concern:*

Be it known that I, PAUL BURKE, a citizen of the United States of America, and a resident of the city of Green Bay, Brown County, Wisconsin, have invented certain new and useful Improvements in Power Shovels, of which the following is a specification.

This invention relates to power shovels and more particularly to that type of shovel in which the hoisting rope or cable is used to actuate th thrusting mechanism.

The object of the invention is to improve and simplify power shovels of the rope thrusting type and to provide for the thrusting of the dipper handle without the usual gear mechanism or rack and pinions or auxiliary driving apparatus of any kind.

The invention further consists in the several features hereinafter set forth and more particularly defined by claims at the conclusion hereof.

Figure 1:
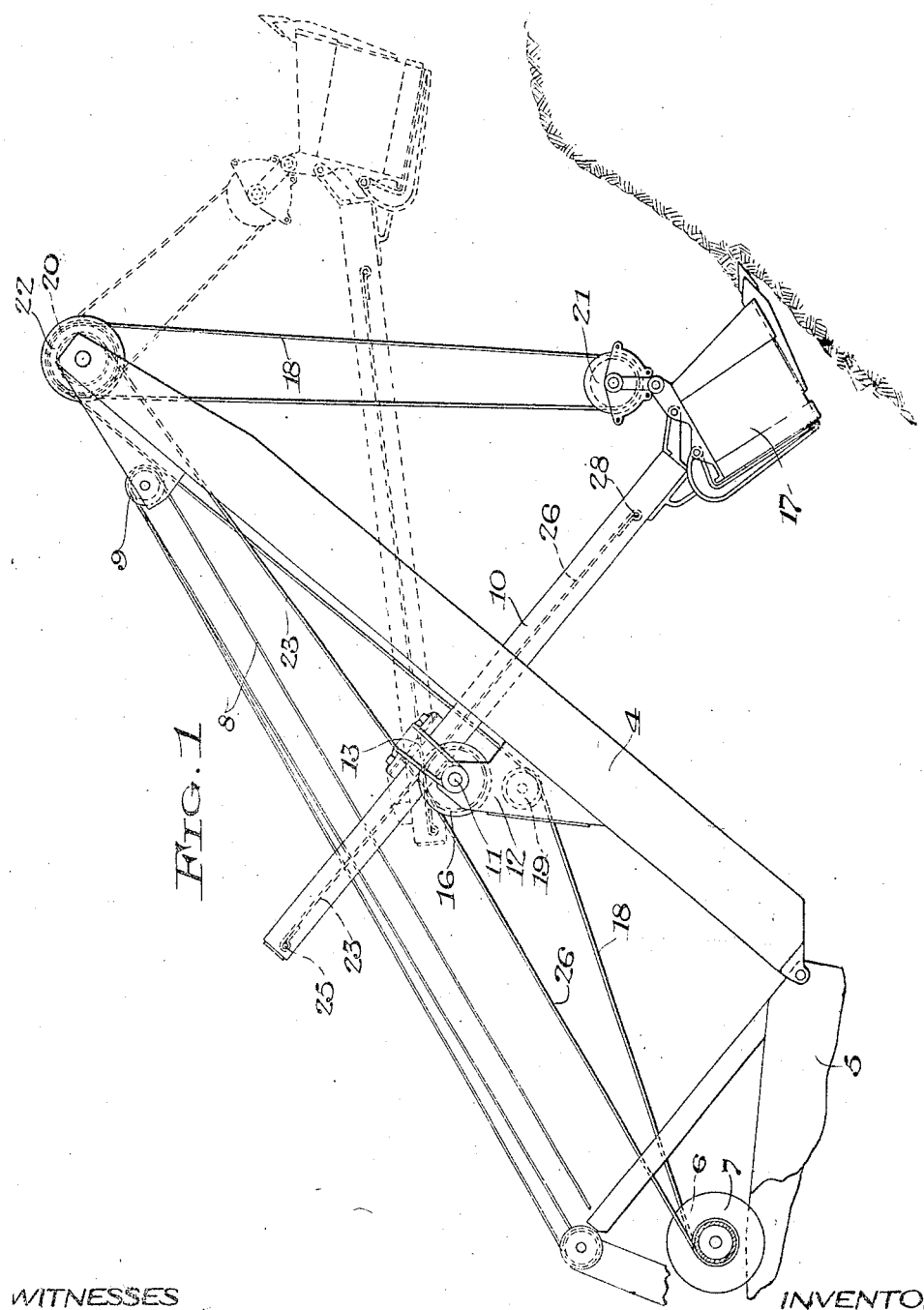
Figure 2:
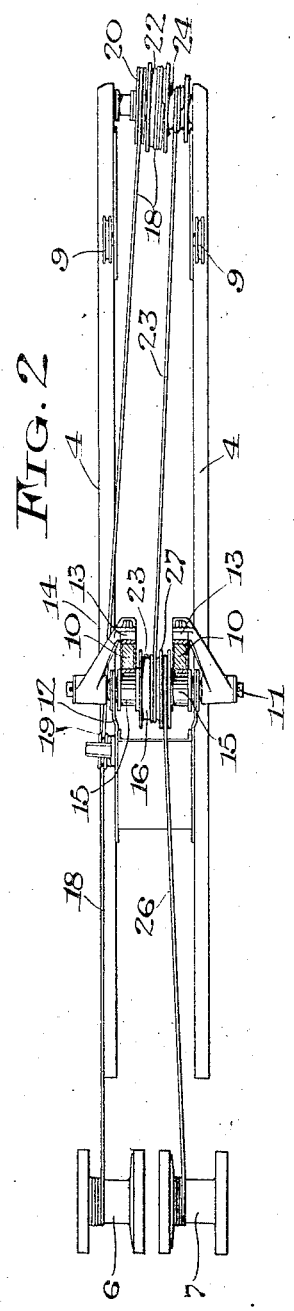
Figure 3:
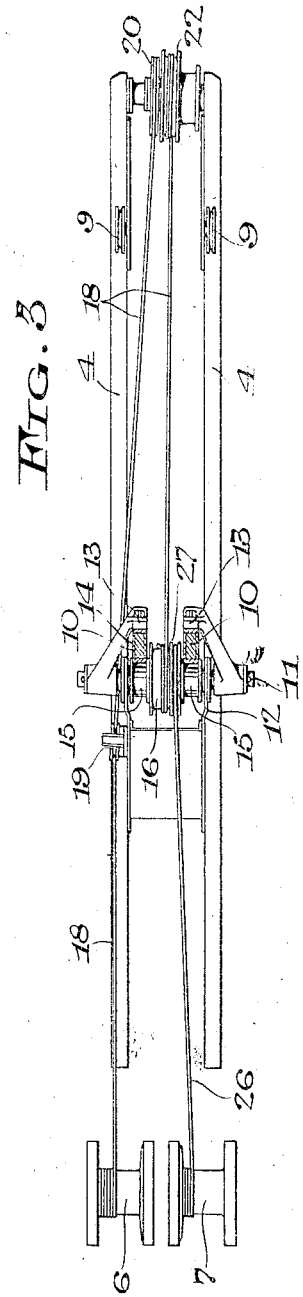

In the drawings: Fig. 1 is a side elevation of a power shovel mechanism embodying the invention; Fig. 2 is a plan view thereof; Fig. 3 is a plan view similar to Fig. 2 showing a modified form of cable arrangement.

In the drawings the numeral 4 designates the boom, which may be of any suitable construction, vertically pivotally attached at its lower end to the rotating base 5 of the machine, which base is of well-known construction. A hoisting drum 6 and an auxiliary drum 7 are mounted on the base 5 in any suitable manner and driven from the prime mover (not shown) on the base. The drums 6 and 7 may be of any well-known construction equipped with clutches and brakes to control their operation. The boom is adapted to be raised or lowered and held in various positions of vertical adjustment by any well-known means, such as a cable 8 connecting pulleys 9 at the outer end of the boom to parts on the rotating base. The boom shown is of the plate girder type with the dipper handle 10 working between its sides.

The shipper shaft 11 is preferably secured in brackets 12 on the boom 4 and the saddle blocks 13 are loose on the shaft. The dipper handle shown is made in two sections and has a metal covering 14. Each section of the handle is mounted to slide between the adjacent saddle block and a flanged roller 15 on the shipper shaft 11. A two-part drum or sheave 16 is preferably journaled on the shipper shaft between the rollers 15. The dipper or shovel may be of any suitable construction and is mounted as usual at the lower end of the dipper handle.

In the construction shown in Figs. 1 and 2 the hoisting cable 18 dead-ended on the drum 6 passes therefrom beneath a guide pulley 19 and over a pulley 20 at the outer end of the boom, then around the padlock sheave 21 carried by the dipper and around the larger part of a compound drum 22 on which it is dead-ended. A cable 23 is dead-ended on the small side 24 of the compound drum 22 at the head of the boom and passes once around the sheave or drum 16 on the shipper or dipper shaft 11 and is dead-ended at 25 near the upper end of the dipper stick or handle 10. A cable 26 secured to and wound upon the drum 7 passes over a sheave 27 conveniently formed as a part of drum 16 and is dead-ended near the dipper as at 28. It will be noted that in this construction the cable or line 23 is not operated directly by any hoisting drum.

With the construction above described, when the drum 7 is prevented from turning by its brake, thereby holding the line or cable 26, and the line 18 is pulled in, the dipper moves in the arc of a circle of which the dipper shaft is the center. If it is desired to crowd further into the bank or to move the dipper farther out, as in loading a wagon, the braking effect on line 26 is released slightly whereupon the line 18 pulling on the large side of drum 20 puts a greater pull on line 23 which thereupon forces the dipper stick outward. Conversely, if it is desired to move the dipper farther in, releasing the brake on line 18 and hoisting with line 26 produces this effect. Thus by a proper manipulation of the lines 18 and 26 any desired swinging or thrusting movement of the dipper and its handle may be effected. Furthermore, since the line 23 which effects the thrust is actuated by the hoist, a crowding effect equal to the full power of the engine is secured.

The construction above described is preferred but in some instances the line 23 may be a part of the line 18 pass over the sheave 20 through the padlock 21 around the drum 22, as shown in Fig. 3, then around the drum 16 and be dead-ended at the upper end of the stick. Such a construction will operate similarly to that previously described though it does not have the advantages incident to the use of the compound drum 22 of the first described construction.

It will be noted that the thrusting action on the dipper is proportional to the load upon the dipper due to the resistance and weight of the material it encounters during digging.

I desire it to be understood that this invention is not to be limited to any specific form or arrangement of parts except in so far as such limitations are specified in the claims.

What I claim as my invention is:

1. In an excavating shovel having a lengthwise movable dipper handle, the combination with the hoisting cable, of means including a cable pulling on the dipper handle and actuated by the hoisting cable for thrusting said handle outwardly to crowd the dipper, and means distinct from said first-named means for retracting the dipper.

2. In an excavating shovel having a lengthwise movable dipper handle, the combination with the hoisting cable, of means actuated by said hoisting cable and pulling on the dipper handle for thrusting said handle outwardly to crowd the dipper, and a separately controlled cable directly connected to said dipper handle for retracting it.

3. In an excavating shovel, the combination with the supporting boom, of a dipper and dipper handle mounted thereon to shift and swing relative to the boom, a shipper-shaft having a drum mounted thereon, a retracting cable passing over said drum and connected to the lower end portion of the dipper handle, a thrust cable on said drum and associated with the upper end portion of the dipper handle, a drum to which the retracting cable is operatively connected, and a drum for hoisting the dipper to which the thrust cable is operatively connected.

4. In an excavating shovel, the combination with the supporting boom, of a dipper and dipper handle mounted thereon to shift and swing relative to the boom, a shipper-shaft having a drum mounted thereon, a retracting cable passing over said drum and directly connected to the dipper handle, means for operating said cable, a compound drum having portions of different diameters at the outer end of the boom, a hoisting cable having one end anchored to the larger diameter portion of said compound drum and having a bight operatively connected with the dipper, a thrust cable having one end anchored to the smaller diameter portion of said compound drum and passing around the drum on said shipper-shaft and having its other end directly associated with the dipper handle for outward crowding of the dipper, and means for operating said hoisting cable.

5. In a power shovel, means for thrusting the lengthwise movable dipper comprising a dipper handle, a shipper-shaft associated with it, a drum on said shaft, and cables on said drum extending in opposite directions and respectively associated with opposite end portions of said dipper handle, hoisting means associated with the outward thrusting cable, and separate means under control of the operator for controlling the operation of said cables.

6. In a power shovel the combination of a supporting base, a boom carried thereby, a dipper handle mounted thereon to shift and swing relative to the boom, a shipper-shaft having a drum mounted thereon, a pair of hoisting drums on said base, two thrust cables, one of said cables leading from one of said hoisting drums over said shipper-shaft drum and to the lower end portion of the dipper handle, the other of said cables leading from the upper end portion of the dipper handle over the shipper shaft drum, and a hoisting cable on the other hoisting drum on the base and operatively connected with the dipper to raise and lower the same and operatively connected to that cable extending to the upper end portion of the dipper handle.

7. In an excavating shovel, the combination with a supporting boom, of a dipper and dipper handle mounted thereon to shift and swing with respect thereto, a separately controlled cable for retracting the dipper, a compound drum having portions of different diameters at the outer end of the boom, a hoisting cable having one end anchored to the larger diameter portion of said compound drum and having a bight operatively connected with the dipper, a thrust cable having one end anchored to the smaller diameter portion of said compound drum and having its other end directly associated with the dipper and its handle for outward crowding of the dipper, and means for operating said hoisting cable.

8. In an excavating shovel, the combination with a supporting boom, of a dipper and dipper handle mounted thereon to move lengthwise and swing relative thereto, a cable having pulling connection with the dipper handle for thrusting it outwardly during hoisting, means for hoisting the dipper, means for operating said cable by said hoisting means, and means distinct from said cable and hoisting means for retracting said dipper.

9. In an excavating shovel, the combination with a supporting boom, of a dipper and dipper handle mounted thereon to move lengthwise and swing relative thereto, a cable having pulling connection with the dipper handle for thrusting it outwardly during hoisting, means for hoisting the dipper, means for operating said cable by said hoisting means, and a separately controlled cable for retracting the dipper.

10. In an excavating shovel, the combination with a supporting boom, of a dipper and dipper handle mounted thereon to move lengthwise and swing relative thereto, a cable having pulling connection with the dipper handle for thrusting it outwardly during hoisting, means for hoisting the dipper, means for operating said cable by said hoisting means with an increase in crowding effort over the hoisting effort, and a separately controlled cable for retracting said dipper.

11. In an excavating shovel, the combination with a supporting boom, of a dipper and dipper handle mounted thereon to swing and move bodily lengthwise relative to the boom, conjointly-controlled hoisting and thrusting mechanism for the dipper and its handle including a cable acting on the upper portion and principally lengthwise of the dipper handle in all of its positions for thrusting the dipper and its handle outwardly during hoisting, and separately controlled means for retracting the dipper.

12. In an excavating shovel, the combination with a supporting boom, of a dipper and dipper handle mounted thereon to swing and move bodily lengthwise relative thereto, a hoisting drum, hoisting and thrusting means actuated by said drum including a cable having a part acting on the upper portion and principally lengthwise of the dipper handle in all of its positions for thrusting the dipper and its handle outwardly during hoisting, and a separately controlled cable for retracting the dipper.

13. In an excavating shovel, the combination with a supporting boom, of a dipper and dipper handle mounted thereon to shift bodily lengthwise and swing with respect thereto, a hoisting drum, cable means between the drum, dipper and dipper handle respectively for hoisting the dipper and exerting a direct end thrust thereon for shifting said handle outwardly during hoisting, and means distinct from said first-named cable means for controlling such shifting movement and to shift said handle inwardly.

14. In an excavating shovel, the combination with a supporting boom, of a dipper and dipper handle mounted thereon to shift bodily lengthwise and swing with respect thereto, a hoisting drum, cable means between the drum, dipper and dipper handle respectively for hoisting the dipper and exerting a direct end thrust thereon for shifting said handle outwardly during hoisting, and a separately controlled cable for moving the dipper inwardly.

15. In a power shovel the combination of a boom, a dipper and dipper handle mounted thereon for swinging and lengthwise shifting movements, a dipper hoisting cable, cable actuating means associated with one end thereof, said cable being associated adjacent the other end thereof with the inner end of said dipper handle to shift said handle outwardly, and means for controlling such shifting movement and to shift said handle inwardly.

16. In a power shovel the combination of a boom, a dipper and dipper handle mounted thereon for swinging and lengthwise shifting movements, a dipper hoisting cable, cable actuating means associated with one end thereof, said cable being associated adjacent the other end thereof with the inner end of said handle to shift said handle outwardly, and means including a cable connected at a fixed point on said handle to shift said handle inwardly.

17. In a power shovel, the combination of a boom, a dipper and dipper handle mounted thereon to shift bodily lengthwise and swing with respect thereto, cable means operatively associated with the outer end of said handle for raising and lowering said dipper and with the inner end of said handle at a fixed point thereon for shifting said handle outwardly only, and separately controlled means for controlling such shifting movement and for shifting said handle inwardly.

18. In a power shovel, the combination of a boom, a dipper and dipper handle mounted thereon to shift bodily lengthwise and swing with respect thereto, cable means operatively associated with the outer end of said handle for raising and lowering said dipper and with the inner end of said handle at a fixed point thereon for shifting said handle outwardly only, and a separately controlled cable for controlling such shifting movement and for shifting said dipper and dipper handle inwardly.

19. In a power shovel, the combination of a boom, a dipper and dipper handle mounted thereon for swinging and lengthwise shifting movements, a dipper hoisting cable, cable actuating means associated with one end thereof, said cable being associated adjacent the other end thereof with the inner end of said dipper handle and acting principally lengthwise thereof in all its positions to shift said handle outwardly, and means for controlling such shifting movement and to shift said handle inwardly.

20. In a power shovel, the combination of a boom, a dipper and dipper handle mounted thereon for swinging and lengthwise shifting movements, a dipper hoisting cable, cable actuating means associated with one end thereof, said cable being associated adjacent the other end thereof with the inner end of said handle and acting principally lengthwise thereof in all its positions to shift said handle outwardly, and means including a cable connected at a fixed point on said handle to shift said handle inwardly.

PAUL BURKE.